United States Patent [19]

Ramm et al.

[11] Patent Number: 4,834,917
[45] Date of Patent: May 30, 1989

[54] ENCAPSULATION OF WASTE MATERIALS

[75] Inventors: Eric J. Ramm, Lilli Pilli; Albert E. Ringwood, Red Hill, both of Australia

[73] Assignees: Australian Nuclear Science & Technology Organization, Lucas Heights; The Australian National University, Acton, both of Australia

[21] Appl. No.: 65,803

[22] Filed: Jun. 23, 1987

[30] Foreign Application Priority Data

Jun. 25, 1986 [AU] Australia ................. RH6566
Sep. 30, 1986 [AU] Australia ................. RH8262

[51] Int. Cl.$^4$ .............. G21F 9/36; G21F 9/16; G21F 9/12
[52] U.S. Cl. .............. 252/633; 250/507.1; 252/628; 252/629; 264/0.5; 264/125; 264/332; 419/48; 419/49; 419/51; 419/68
[58] Field of Search .............. 252/633, 628, 629; 250/506.1, 507.1; 419/39, 42, 48, 49, 51, 68, 60; 264/101, 102, 0.5, 125, 319; 422/159, 71; 425/405 R, 405 H, 78; 222/92; 72/59; 100/211

[56] References Cited

U.S. PATENT DOCUMENTS

| | | | |
|---|---|---|---|
| 4,172,807 | 10/1979 | Larker | 264/0.5 |
| 4,338,215 | 7/1982 | Shaffer et al. | 252/628 |
| 4,409,029 | 10/1983 | Larker et al. | 419/10 |
| 4,590,000 | 5/1986 | Baatz et al. | 252/633 |
| 4,626,414 | 12/1986 | Baatz et al. | 422/159 |
| 4,642,204 | 2/1987 | Burstrom et al. | 252/633 |
| 4,645,624 | 2/1987 | Ramm et al. | 252/628 |
| 4,654,171 | 3/1987 | Boncoeur et al. | 252/626 |

Primary Examiner—Howard J. Locker
Attorney, Agent, or Firm—Ladas & Parry

[57] ABSTRACT

Waste material such as toxic compounds, radioactive waste materials and spent nuclear fuel rods are encapsulated in a container system which is subjected to a hot pressure process to cause a protective powder material located around the waste material to form a dense matrix and function as a highly corrosion resistant and protective shroud. Embodiments include hot isostatic pressing and hot uniaxial pressing, the use of metal powder such as copper powder for the protective powder material or alternatively ceramic powder and, depending upon the embodiment chosen, the use of a single container or dual container system in which a first container is located within an outer container. Either or both of such containers may be cylindrical with a bellows-like side wall to facilitate compression thereof in an axial direction.

24 Claims, 7 Drawing Sheets

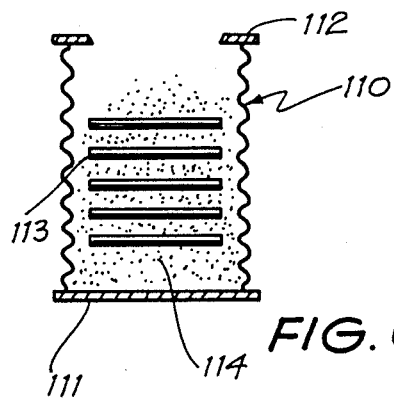
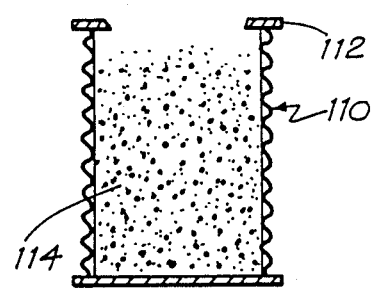
FIG. 6A  FIG. 6B
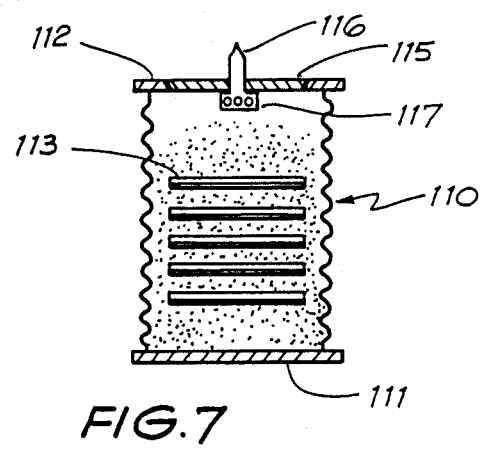
FIG. 7
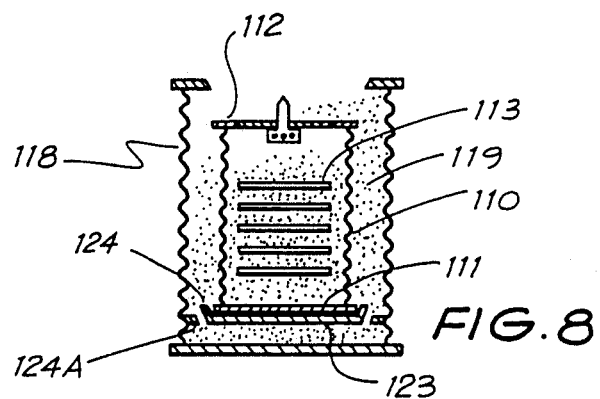
FIG. 8

ENCAPSULATION OF WASTE MATERIALS

FIELD OF THE INVENTION

The present invention relates to the encapsulation of waste materials and is especially applicable to providing a system whereby safe long-term storage can be obtained for dangerous waste materials such as radioactive waste materials and toxic compounds. Radioactive waste materials include spent nuclear fuel rods as well as high level radioactive waste produced by reprocessing spent nuclear fuel rods.

BACKGROUND TO THE INVENTION

Although in some embodiments the invention may be applicable to waste materials other than radioactive waste, the present invention will be illustrated with particular reference to high level radioactive waste and spent nuclear fuel rod encapsulation.

High level radioactive waste usually is in the form of a solution of the waste. This solution can be calcined at 600° C.–800° C. temperature to provide the waste in powder form. The waste must be safely encapsulated in some system which is corrosion and heat resistant and will prevent the waste coming into contact with any ground water so that the possibility of contamination of ground water through leaching is avoided.

Alternatively, spent fuel rods could be simply disposed of in a safe containment system.

Various prior proposals have been published in relation to safe disposal of nuclear waste. One proposal is to immobilise the waste as a minor component of a synthetic rock matrix which is produced from mineral precursor components and the waste in powder form. The matrix is produced under conditions of high temperature and high pressure maintained for several hours. Suitable synthetic rock structures have been published by A. E. Ringwood et al, see for example the following:

Nature March 1979
European Patent Application No. 79301382.2
U.S. patent application Ser. No. 124953

Engineering techniques for production of synthetic rock incorporating the high level waste include hot isostatic pressing processes (see for example European Patent specification No. 0044381 assigned to ASEA) and hot uniaxial processes (see Australian patent application No. 18163/83 and equivalent U.S. Pat. No. 4,645,624 assigned to the assignees of the present application.

Another publication by ASEA concerns a suggested process in which a copper canister is filled with a mixture of unprocessed spent nuclear fuel and copper powder. Hot isostatic pressing is specified for the purpose of embedding the fuel in a dense copper matrix.

Yet another publication by ASEA (see U.S. Pat. No. 4,209,420 H. Larker) concerns a suggested process in which a ceramic canister (formed by hot isostatic pressing) is filled with a unprocessed spent nuclear fuel waste and a lid is placed in position. A gas-tight shroud of metal is placed around the canister. Hot isostatic pressing at very high pressure is specified for the purpose of joining the lid to the canister body.

Another proposal for nuclear fuel storage has been made in a paper entitled "Final Storage of Spent Nuclear Fuel" by Swedish Nuclear Fuel Supply Company (KBS Division). A massive copper canister having relatively thick walls receives spent nuclear fuel rods and copper powder fills the voids around the rods and within the canister. A lid is applied and the canister placed in a thin walled container. Evacuation of air from within the canister takes place and the outer container can then be sealed and passed to a hot isostatic pressing step operating typically at 500° C. and the very high pressure of 150 MPa. The very high pressure is necessary to bond the lid to the container by sintering.

The proposals described in the previous three paragraphs are widely questioned as not viable on grounds including feasability and safety because of the very high pressures involved.

Yet a further proposal is to encapsulate the unprocessed spent nuclear fuel in a dense graphite nickel sulphide bonded matrix. It appears such a matrix can be formed at about 500° C. but it is questionable whether the matrix would be considered safe for long-term storage because of an inherent brittle characteristic with the attendent risk of fracture and leaching of radioactive components by ground water. Furthermore, the long-term stability of the matrix in terms of its resistance to leaching does not appear to be established.

Accordingly, over a period of many years there have been extensive investigations at considerable cost in to many different kinds of systems for safely immobilising radioactive waste for disposal. With a view to providing a system having commercial attractivness with inherent acceptable safety, and the practicality to operate on a long-term basis, the present invention has been devised and provides new and useful alternatives to previous published proposals.

SUMMARY OF THE INVENTION

According to a first aspect of the present invention, there is provided a method of immobilising a waste material comprising (a) taking a generally cylindrical container having a base and having a side wall extending around the axis of the container and incorporating a bellows-like convolution to permit the container during the process to be substantially uniaxially compressed with substantial reduction in axial length and relatively little change in radial dimensions or distortion, the metal being highly resistant to corrosion and maintaining substantial strength at temperatures used in the process, (b) filling the container with solid material comprising the waste material, (c) providing protective particulate material for forming a dense solid barrier around the waste material during the method, (d) closing the container, (e) heating the container to an elevated temperature and applying uniaxial pressure along the direction of said axis, the temperatures and pressures being selected such that the waste material becomes immobilised in a dense solid matrix of the protective particulate material, and the method being characterised by at least a part of the protective particulate material being in intimate contact with the waste material and at least a part of the protective particulate material comprising a metal powder which is retained and disposed around the waste material for forming a dense shroud which is of a metal highly resistant to corrosion, whereby the waste material is immobilised.

The above described aspect of the invention may be implemented by incorporating the metal powder (such as copper powder) with the waste material in said container but in another form this aspect of the invention may be implemented, by for example, using a different type of protective Particulate material (such as ceramic powder) within said defined container and disposing the part of the protective particulate material constituting the metal powder around said defined container; for this purpose an outer container is used for holding the particulate material in the desired disposition prior to and during the heating and pressure step, during which the metal powder forms the dense solid matrix as a shroud.

In a preferred and important embodiment of the invention and to enhance intrinsic safety of both the process and long term storage of the waste, before the heating and pressure step the container is placed within an outer axially compressible cannister, the space between the inner container and the cannister being filled with a metal powder which forms a dense solid sheath around the container during the hot uniaxial pressing step, pressure being applied to the ends of the outer cannister.

Preferably, a high temperature, high strength corrosion resistant alloy is chosen as the metal for constructing either the bellows container or the outer cannister. A suitable alloy is Inconel 601. Furthermore, copper powder is advantageously used within the cannister and container. This copper metal or alloy can be such that the process can operate at around 600° C.–800° C.

Another important feature which is included in a preferred embodiment is an off-gas venting structure which is preferably associated with the base portion of the bellows container and/or the bellows-like outer cannister, whereby gas is discharged where heat and pressure is applied to the contents; the gas is collected and filtered as necessary in a suitable system.

The process furthermore may include the preliminary step, if desired, of purging the interior regions of the cannister and/or the bellows container with an inert gas thereby removing oxygen and unwanted gasses from the interstices of the particulate material whereby any unwanted oxidation effects are prevented. This can be achieved simply by evacuating and then back-filling the system through a connection to the off-gas structure.

Although the process may be used with various waste materials, an especially advantagous and important application is where the waste is a high level radioactive waste calcine or alternatively comprises spent fuel rods suitably granulated. However, if desired the fuel rods could be encapsulated without prior granulation by simply stacking the fuel rods in the bellows cannister either in a coiled form or otherwise and surrounding the rods with the suitable particulate metal powder.

Accordingly, the present invention can provide a process which can be operated by inherently simple equipment capable of being serviced in an active cell by remote manipulators, yet provides a safe and practical immobilisation of the waste in a system which is highly corrosion resistant. Furthermore, the high coefficient of thermal conductivity is such that dissipation of heat from radioactive decay over a long period of time can occur.

According to a second aspect of the present invention, there is provided a method of immobilising a waste material comprising (a) taking a first metal container, the metal being highly resistant to corrosion and maintaining substantial strength at temperatures used in the process, (b) filling the first container with the waste material or a combination of the waste material and protective powder material which is either a ceramic powder or metal powder of a metal which is highly resistant to corrosion, said ceramic powder or metal powder being such that the waste material can be distributed therethrough and immobilised therein, (c) substantially evacuating and closing the first container, (d) placing the first container in an outer container and introducing a protective powder material to support said first container within the outer container and spaced from the walls of the outer container, the protective powder material comprising either a ceramic powder or a metal powder, (e) substantially evacuating and closing the outer container, and (f) heating said containers and their contents to an elevated temperature and applying external pressure, the temperatures and pressures being selected such that the waste material becomes bound in a dense solid matrix of the ceramic powder or metal powder and a dense protective shell is provided by the first container, the outer container and a solid dense matrix formed therebetween from said protective powder.

This second aspect of the invention is preferably implemented by forming both the first metal container and the outer container with a generally cylindrical form and having a side wall incorporating a bellows-like shape.

With this second aspect of the invention, pressure may be applied in a hot isostatic pressing process which surprisingly can be very effective at relatively low pressures and modest temperatures for providing effective encapsulation of waste material. A typical process would operate at pressures in the range 20 to 25 MPa with a temperature of the order of 800° C. and pressure maintained for about 1 hour. A typical container arrangement would have an external diameter of about 800 mm and an initial length of about 1800 mm. In such an example the containers would have relatively thin walls of the order of 3 mm thick and the spacing between the inner and outer containers would be about 75 mm.

Of great significance is the relatively low operating pressure which may be compared with prior art proposals which require of the order of 150 MPa to deform the primary container and to bond the lid onto the container. Embodiments of the invention can greatly reduce the major problems of safely incorporating the equipment into an active cell. Because the pressures are lower, the design of the sealing arrangements is so much easier and servicing and maintainance may be considered viable with remote handling equipment.

Thus, use of embodiments of the invention permits a viable and effective system to be designed for use in an active cell with radioactive waste and results in a capsule which is highly resistant to the escape of the waste materials over very extended storage periods.

An important embodiment of the invention is to the encapsulation of spent nuclear fuel rods which are straight or coiled into a spiral. The fuel rods are placed in the inner container and surrounded with the powder and it has been found by the use of copper powder at temperatures as low as about 800° C. effective metal flow and encapsulation can be achieved. Furthermore, the inner container by virtue of its surrounding sheath structure is heavily reinforced and provides a very secure containment structure both during the encapsulation process and for subsequent storage.

Preferably, the method includes using a particulate filter and off-gas connection to said inner container to facilitate the step of evacuating the inner container through the off-gas system and filter before sealing the off-gas pipe.

Preferably, a similar arrangement is also provided for the outer container, whereby the outer container is also evacuated and the off-gas pipe sealed before the hot pressing step.

A third aspect of the present invention is directed towards a method of encapsulation of radioactive waste products which not only is directed to providing safe long term storage and containment, but also is specifically adapted to permit retrieval of the waste products at a much later date where reprocessing may be required. Many high level types of radioactive waste contain very valuable components and after a period of many years storage, during which decay of certain components takes place, it may be desired to retrieve the material and reprocess.

A novel method for achieving such a containment is provided by a method which uses a substantially non-deformable inner vessel for containing the radioactive waste material securely during the method and during storage, the inner vessel being placed within a deformable outer vessel and a protective metal sheath (highly resistant corrosion) being formed between the inner and outer vessels by placing in this zone metal material which has a substantially lower melting point than the inner vessel and the outer vessel and which is capable of forming a dense matrix; the method further comprises closing the outer vessel and subjecting the structure to sufficiently elevated temperature and pressure for sufficient time to compress the outer container and the metal material to form a dense sheath, whereby at any subsequent time the outer container may be opened and subjected to a heating process to remove the metal material, thereby releasing the inner vessel for removal of its contents.

In a preferred embodiment of this method any one or more and preferably most or all of the following features are used:

(a) The outer vessel is cylindrical with a bellows-like side wall;

(b) The inner vessel is cylindrical with domed ends to form a pressure vessel;

(c) After closure of the inner and outer vessels both are evacuated and then sealed before the pressing process which is an isostatic process;

(d) The metal material is a copper or copper alloy supplied in powder form;

(e) The processing conditions are typically 800° C., 20 MPa and a time of about 1 hour.

For illustrative purposes only, embodiments of the invention will now be described with reference to the accompanying drawings of which:

FIG. 6A illustrates filling an inner container in which the waste material is in the form of spent fuel rods;

FIG. 6B illustrates an alternative in which waste material in particulate form is processed;

FIG. 7 illustrates evacuation and closure of the inner container of FIG. 6A;

FIG. 8 illustrates placing the inner container in an outer container;

Figure 1:
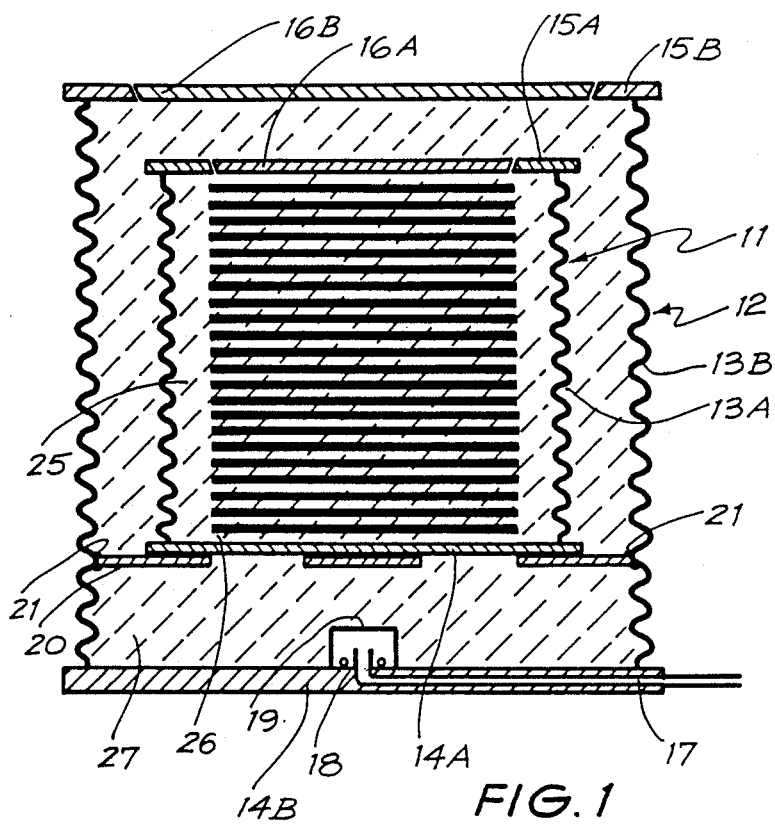
FIG. 1 is a schematic view of a double bellows container incorporating spent fuel rods and constituting a first embodiment.
Figure 2:
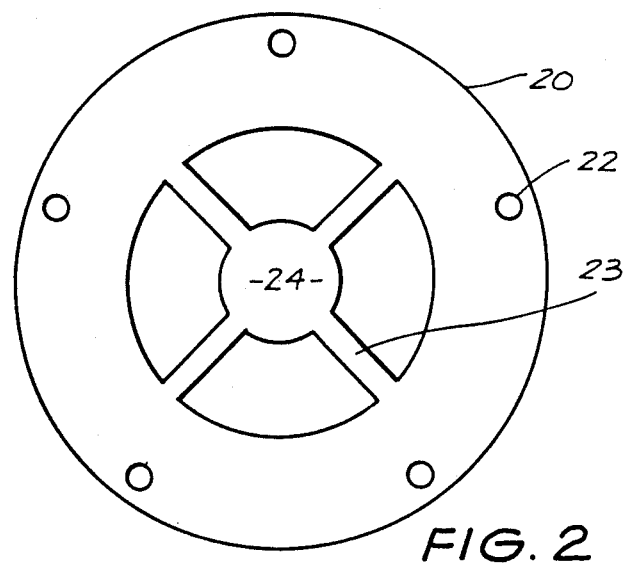
FIG. 2 is a sketch in plan view of the interior transverse wall for the outer container shown in FIG. 1.

Referring first to FIGS. 1 and 2, inner and outer cannisters 11 and 12 are used, each cannister being of generally similar form and being of heat and corrosion resistant alloy which retains adequate strength for pressing operations at up to 1200° C. Each cannister has a respective convoluted side wall 13A, 13B, a rigid base wall 14A, 14B, a rigid annular top wall 15A, 15B and a lid 16A, 16B which is adapted to be welded into position after filling of the container.

FIG. 1 also illustrates an off-gas system for the outer cannister, the off-gas system comprising an off-gas duct 17 passing radially through the base 14B and adapted to be connected to an off-gas system during the hot pressing step. The duct 17 terminates in an axial inlet duct 18 leading to a chamber within a cap 19 having an apertured side wall. A suitable particle filter can be located within the cap to prevent the entrainment of metal particles and their discharge through the off-gas system.

Furthermore, the outer cannister incorporates a transverse wall 20 welded to the interior of the convoluted bellows wall at 21. The transverse wall 20, as best shown in FIG. 2, is of generally annular form incorporating spaced holes 22 through which particulate metal can fall, a series of four radial arms 23 and a central plate 24 for supporting the inner container. The transverse wall 20 is suitably of an alloy which is resistant to high temperature and corrosion and has a further function of stiffening the outer container to help control any gross outward deformation during the pressing step and also acts as an important heat transfer element to facilitate rapid and uniform heating to be achieved within the structure.

The product shown in FIG. 1 is formed by first progressively filling the inner bellows cannister 11 with particulate copper powder or ceramic powder 25 and spirally bent fuel rods 26 which are spaced apart by layers of copper powder. A vibratory compaction technique is used to achieve a high packing density. After the cannister is filled, it is evacuated and the lid 16A is welded into position.

The outer cannister 12 is filled with copper powder 27 to the level of the transverse wall 20 again using a vibratory support bed to cause good packing of the powder. The inner cannister 11 is then placed in position so that with a suitable manipulator additional copper powder is poured in under vibration to fill the container. The lid 16B is welded into position.

Figure 5:
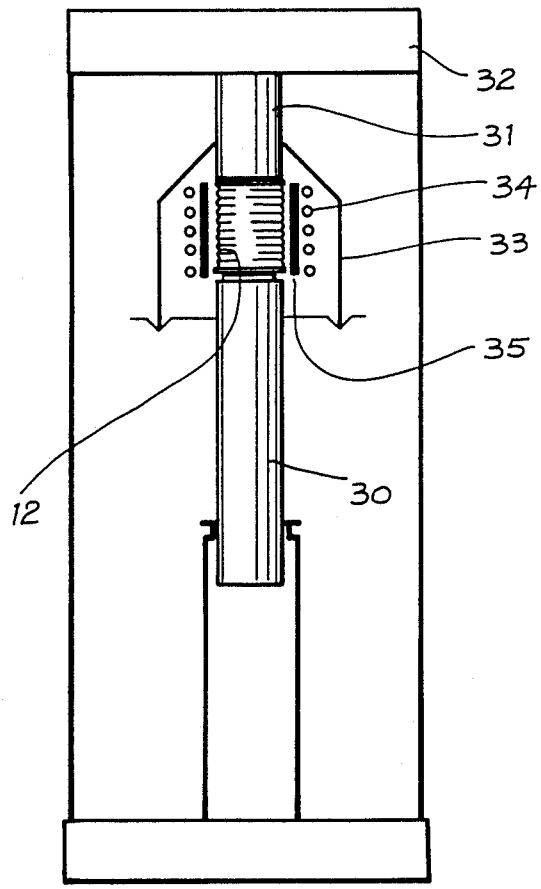
FIG. 5 is a schematic elevation of a hot upward uniaxial pressing apparatus for forming the products shown in FIGS. 1 to 4.

The unit shown in FIG. 1 is then transferred conveniently to a preheating station and then transferred to a hot press generally of the type shown in FIG. 5. The hot Press comprises an upwardly acting hydraulic ram 30, a fixed upper abutment pad 31 and a surrounding frame 32. A safety shroud 33 surrounds an electrical induction furnace 34 and also acts as a thermal shield to prevent heat loss. A metal cylindrical sleeve 35 functions as a susceptor in which heat is generated by operation of the induction furnace so that the composite bellows container 12 supported on the ram 30 is continuously heated during the pressure process.

Typically, when copper powder is used a pressure of about 14 MPa is applied at a temperature of about 750° C. for a period of the order of 20 minutes. As the pressure is maintained, the bellows cannisters slowly compress in an axial direction to a substantial extent with relatively small outward deformation. This facilitates subsequent handling and disposal of the composite cannister unit.

Figure 3:
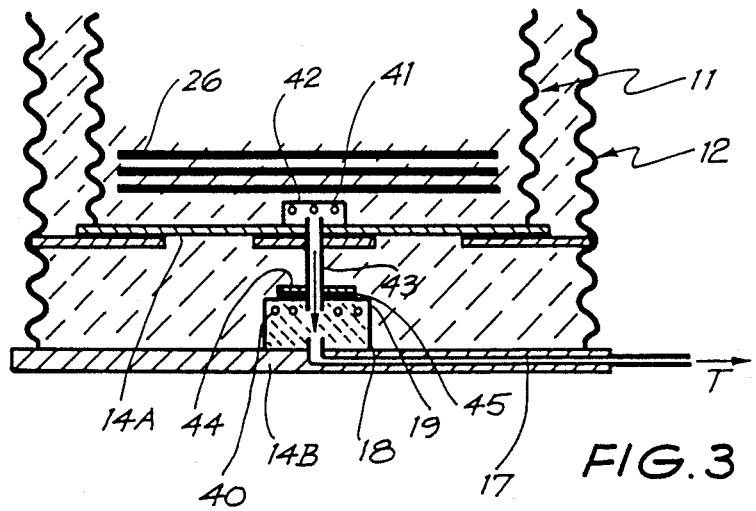
FIG. 3 is a part view corresponding to FIG. 1 and showing the incorporation of an off-gas unit in the base region of the inner bellows container.

Referring now to FIG. 3, in this embodiment an off-gas system is illustrated also for the inner bellows cannister 11. FIG. 3 illustrates the provision of a permeable filter of sintered metal or alumina fibre 40 and 41 provided within the respective rigid cap structures 19 and 42 inside the respective cannisters. A connection tube 43 is rigidly connected to and extends from a central aperture in the base wall 14A of the inner container and at its lower end carries a disk-like rigid head 44 with an annular sealing washer 45 for sealing engagement during the compression step with the top wall of the cap 19. It will be noted that the lower free end of the tube 53 extends within a central circular apperture at the top of the cap 19. The connecting tube 43 collapses and completely seals the system after hot pressing.

Figure 4:
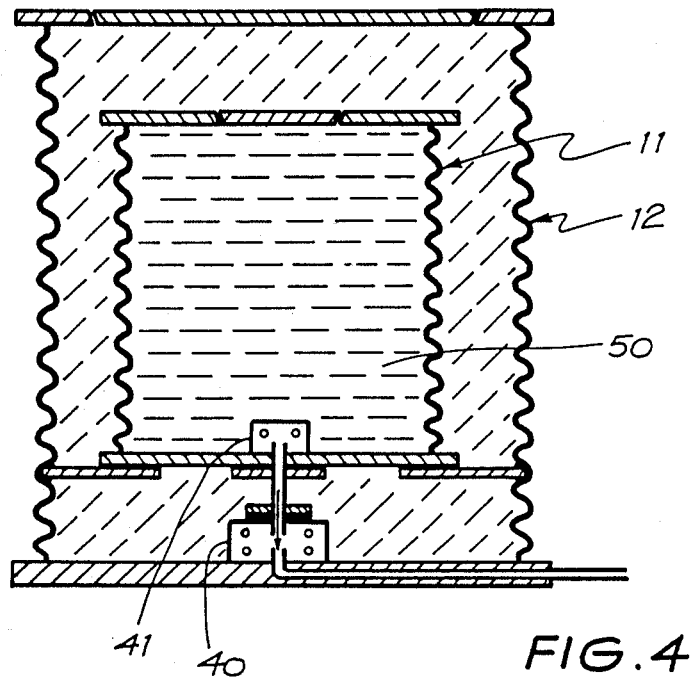
FIG. 4 is a view of a second embodiment wherein the waste is calcine intimately mixed with ceramic powder or metal powder within the interior bellows.

FIG. 4 illustrates a further embodiment which is similar to that shown in FIG. 3 but instead of the encapsulation of spent fuel rods the inner cannister 11 contains an intimate mixture of granulated or finely crushed unprocessed spent fuel, and copper or ceramic powder 50. Otherwise the components are similar and like reference numerals have been used.

Reference will now be made to FIGS. 6A, 6B and 7 to 11 in which use of an alternative method is illustrated. This method utilises an inner bellows container 110 of Inconel 601 of cylindrical form with a convoluted bellows-like peripheral wall and rigid flat ends. The base end wall 111 is welded to the bellows-like wall, to the top of which an annular top flange 112 is welded. In the illustrated embodiment of FIG. 6A and FIGS. 7–11, spent nuclear fuel rods 113 are inserted into the inner container 110 with protective powder 114 separating the fuel rods from the walls of the inner container 110 and from adjacent rods. In a preferred embodiment copper powder is used and vibration is applied during the filling operation to acheive maximum packing density.

FIG. 6B illustrates an alternative in which calcined high level nuclear waste in Particulate form is poured into the container or mixed with the protective powder and poured into the container 110.

As shown in FIG. 7, in the second step of the method a lid 115 is welded onto the upper flange 112, the lid in its central region having a short upstanding off-gas pipe 116 in communication with the downstream side of a rigid particle filter 117. In the method, the lid 115 is welded into position and the interior of the container evacuated through pipe 116. The pipe is then closed by welding. The closed container then advances to step 3, which is shown in FIG. 8, wherein the container is placed within an outer similarly shaped container 118 with protective powder 119 (which again is preferably copper powder) separating the inner container from the outer container. The preferred method is to pour copper powder into the outer container 118 to a level slightly below an internal collar 124 and then to place the inner container 110 in the collar. Further copper powder is then poured in to fill the container 118 and vibration again is used to achieve high packing density. Any space can then be filled with further copper powder to top-up the container. From FIG. 8 it will be seen that the inner container 110 is supported on a transverse perforated support base 123 with collar 124 attached to its top face.

Figure 9:
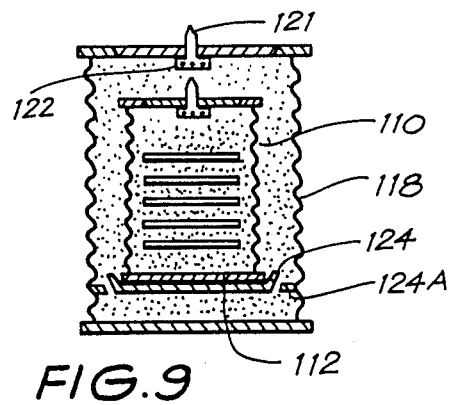
FIG. 9 illustrates evacuation and closure of the outer container.

As shown in FIG. 9, a similar lid 120 is welded onto the outer container and evacuation takes place through its off-gas pipe 121, the gas being filtered through the particle filter 122.

Figure 10:
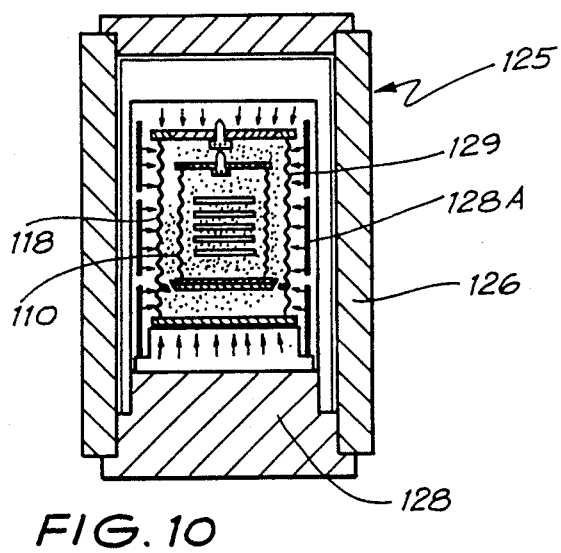
FIG. 10 illustrates hot isostatic pressing of the container combination.

The final step of the method is shown in FIG. 10. A hot isostatic pressing furnace 125 is schematically shown in FIG. 10 and comprises a rigid cylindrical wall 126, a rigid top 127 to which the cylindrical wall is sealed and a removable base closure pad 128 which can be sealingly engaged with the cylindrical wall to form a pressure vessel. A cylindrical array of heating elements 128A are arranged within the pressure vessel for raising the temperature to that which is desired and the pressure vessel has an inlet for pressurised inert gas which is disposed in the zone 129 surrounding the outer bellows-like container 118.

It is preferred to preheat the container 118 and its contents in a separate Preheating furnace and then to plate the preheated container on pad 128 and then insert into the isostatic pressing furnace. The furnace is then pressure sealed and the gas within the furnace raised to the required temperature and pressure e.g. 800° C. and 20 MPa. The powder 114 and 119 densifies and flows to form a dense mass and the inner and outer containers 110 and 118 are compressed generally in a uniaxial fashion as the containers have substantial radial stiffness but little axial stiffness. These conditions are maintained for about 1 hour until a uniform structure is achieved in which, in this example, the spent fuel rods are safely encapsulated in a dense copper sheath which also incorporates the corrosion resistant inner and outer containers 110 and 118.

Figure 11:
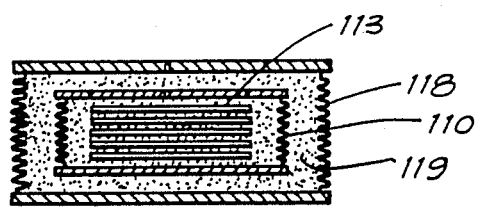
FIG. 11 illustrates the hot, isostatically pressed combination.

FIG. 11 shows the final container combination after the hot isostatic pressing process. This unit is of substantially cylindrical form and adapted to be deposited in a safe subteranian installation, the protective material around the nuclear waste providing an effective and very long term shroud resistant to decay, corrosion and leaching by ground water.

A further embodiment will now be described with reference to FIGS. 12–18 in which a non-deformable inner vessel retains safely radioactive waste and a suitable dense metal sheath is formed around the inner vessel at relatively low temperatures and pressures and, most importantly, the melting point of the material forming the sheath is substantially lower than the melting point of the inner vessel or the outer vessel so that the sheath can be removed in a suitable furnace thereby permitting retrieval of the inner vessel and the waste for reprocessing.

Figure 12:
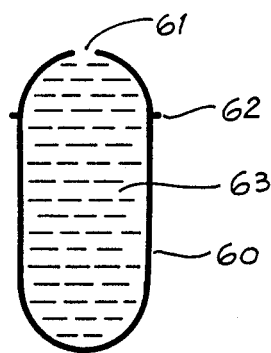
FIG. 12 illustrates filling an inner vessel with particulate material for a further embodiment of the invention.
Figure 13:
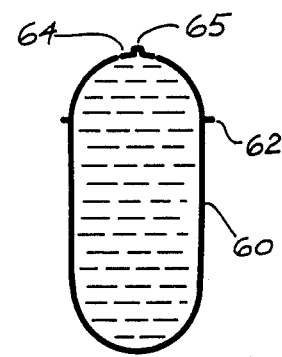
FIG. 13 illustrates closure of the vessel of FIG. 12.

FIG. 12 shows a cylindrical metal vessel 60 having domed ends with an aperture 61 at the top end for receiving high level radioactive waste in the form of calcine 63 and an annular collar 62 around the upper end of the vessel to permit it to be lifted and moved. The vessel 60 is of a metal which is highly resistant to corrosion, substantially non-deformable in the process and retains high strength at temperatures in the process. A suitable metal would be Inconel 601. After the vessel has been filled with calcine 63, its upper end is closed with a top cap 64 having an evacuation tube 65 through which gas is evacuated from the vessel 60 and, in a welding process, the tube 65 is sealed off.

Figure 14:
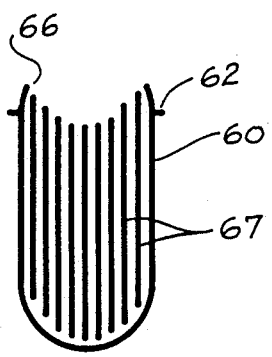
FIG. 14 illustrates an alternative embodiment to FIG. 12 and wherein an inner vessel receives spent nuclear fuel rods.
Figure 15:
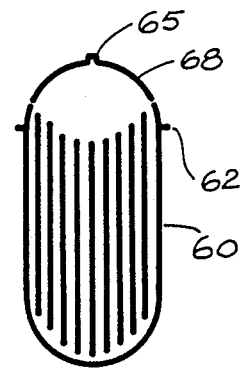
FIG. 15 illustrates closure of the vessel shown in FIG. 14.

FIGS. 14 and 15 show an alternative embodiment in which a large aperture 66 is provided at the top of the vessel whereby a bundle of spent nuclear fuel rods 67 can be inserted within the vessel. As shown in FIG. 15 the vessel is closed in a similar manner by a top cap 68, evacuated and sealed.

Figure 16:
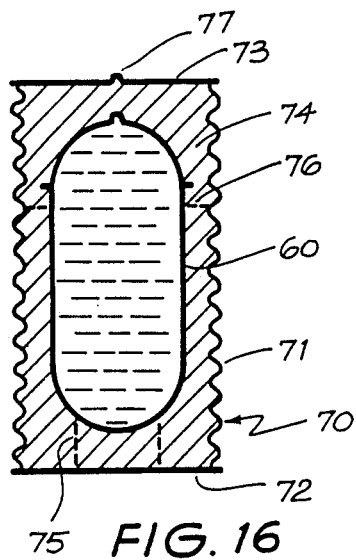
FIG. 16 illustrates the inner vessel located within the outer vessel and surrounded by metal powder and prior to a hot pressing process.

As shown in FIG. 16 the inner vessel 60 is located within a cylindrical outer vessel 70 having a bellows-like side wall 71 and planar end walls 72 and 73. In this embodiment copper powder 74 is used for forming the protective sheath since it is highly corrosive resistant, will form a dense matrix, is economic and has a suitably low melting point. A perforated cylinder 75 of the same material namely copper is disposed in the central lower region of the bellows container 71 and supports the inner vessel 60. A perforated annular disk 76 also of copper is provided in the upper region for centralising the inner vessel 60.

FIG. 16 shows the assembly after the copper powder 74 has been poured into the space between the vessels, vibration assisting the establishment of a good packing density. The top end wall 73 is welded into position and gases within the bellows container 71 evacuated through evacuation tube 77, which is then welded to seal the structure.

Figure 17:
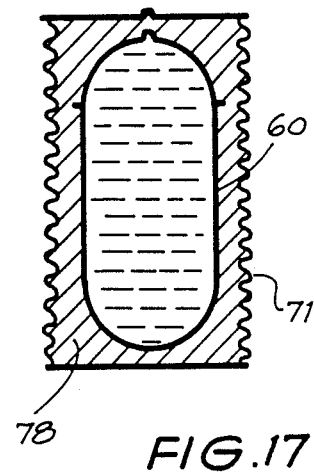
FIG. 17 illustrates the structure of FIG. 16 after the hot pressing process.

Hot isostatic pressing is conducted in this example, typical conditions being 800° C., 20 MPa and a time of about 1 hour. The resultant end structure is generally as shown in FIG. 17, the bellows container 71 being axially compressed but not distorted or substantially deformed in the radial direction. A dense copper sheath 78 is formed between the vessels and provides a massive barrier for safe containment of the radioactive waste. The copper sheath is highly corrosion resistant and can also conduct away heat generated during radioactive decay of the material in the inner vessel 60.

The outer bellows container 71 is formed of a metal having a good strength at high temperatures, a convenient metal being Inconel 601. However, safe containment of the radioactive material does not depend on the bellows container 71 as the copper sheath 78 is the essential safety element, even though normally the bellows container 71 will provide a reliable and complete containment structure.

Figure 18:
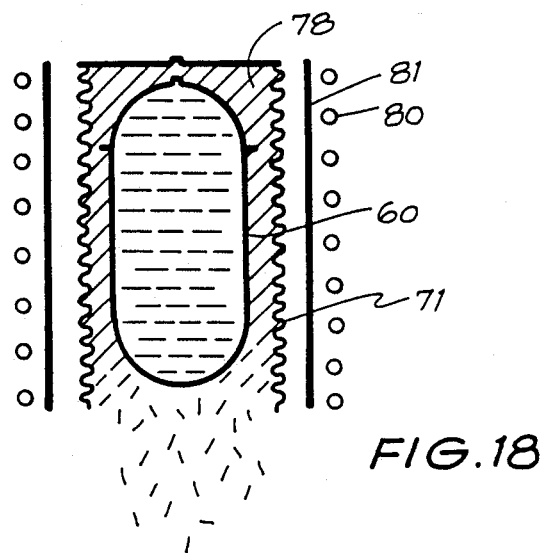
FIG. 18 illustrates a method of removing the sheath to permit retrieval of the inner vessel, the inner vessel being that shown in FIGS. 12 and 13.

FIG. 18 illustrates the method of recovering the high level waste for reprocessing. The base 72 of the bellows container 71 is removed and the assembly supported in an induction furnace having coils 80 and a suscepter sleeve 81. At a temperature of about 800° C. the copper matrix 78 is melted and flows into a receiving crucible located below the furnace thereby releasing the inner vessel 60 for processing. Providing the copper is not contaminated it may be re-used.

We claim:

1. A method of immobilizing a waste material comprising:
    (a) taking a generally cylindrical metal container with an axis and having a base and having a side wall extending around the axis of the container and incorporating a bellows-like convolution to permit the container during the process to be substantially uniaxially compressed with substantial reduction in axial length and relatively little change in radial dimensions or distortion, the metal being highly resistant to corrosion and maintaining substantial strength at temperatures used in the process,
    (b) filling the container with solid material comprising the waste material,
    (c) providing protective particulate material for forming a dense solid barrier around the waste material during the method,
    (d) closing the container,
    (e) placing the container within in an outer axially compressible canister so as to provide a space between the container and the canister, the space between the container and the canister being filled with a metal powder which forms a dense solid sheath around the container,
    (f) heating the container and canister to an elevated temperature and applying uniaxial pressure along the direction of said axis, the temperatures and pressures being selected such that the waste material becomes immobilized in a dense solid matrix of the protective particulate material, and the method being characterized by at least a part of the protective particulate material being in intimate contact with the waste material and at least a part of the protective particulate material comprising a metal powder which is retained and disposed around the waste material for forming a dense shroud which is of a metal highly resistant to corrosion, whereby the waste material is immobilized, the metal powder in the space between the container and the canister forming a dense solid sheath around the container during the hot uniaxial pressing step.

2. A method according to claim 1, wherein an off-gas structure is associated with the base portion of the bellows container and/or the outer axially compressible canister, whereby while heat and pressure are applied, gas is discharged through the off-gas structure, the gas being then collected and filtered by an off-gas system.

3. A method according to claim 2, and wherein before the heating step the process includes the step of purging the interior regions of the canister and/or the bellows container with an inert gas, thereby removing oxygen and unwanted gases from the interstices of the particulate material whereby any unwanted oxidation effects are prevented.

4. A method according to claim 1 wherein said metal powder in the space between the container and the canister is copper or a copper alloy.

5. A method according to claim 1 wherein a corrosion resistant and high temperature resistant alloy is chosen as the metal for the bellows container and the outer canister.

6. A method according to claim 1 wherein a metal powder is used in the material filling said container and the metal powder is copper or a copper alloy.

7. A method according to claim 1 wherein the waste material comprises spent nuclear fuel rods bent into a spiral form and arranged in a stack.

8. A method according to claim 1 wherein the waste material comprises calcined high level radioactive waste.

9. A method of immobilising a waste material comprising
 (a) taking a first metal container, the metal being highly resistant to corrosion and maintaining substantial strength at temperatures used in the process,
 (b) filling the first container with the waste material or a combination of the waste material and protective powder material which is either a ceramic powder or metal powder of a metal which is highly resistant to corrosion, said ceramic powder or metal powder being such that the waste material can be distributed therethrough and immobilized therein,
 (c) substantially evacuating and closing the first container,
 (d) placing the first container in an outer container and introducing a protective powder material to support said first container within the outer container and spaced from the walls of the outer container, the protective powder material comprising either a ceramic powder or a metal powder,
 (e) substantially evacuating and closing the outer container, and
 (f) heating said containers and their contents to an elevated temperature and applying external pressure, the temperatures and pressures being selected such that the waste material becomes bound in a dense solid matrix of the ceramic powder or metal powder and a dense protective shell is provided by the first container, the outer container and a solid dense matrix formed therebetween from said protective powder.

10. A method as defined in claim 9 wherein said external pressure is applied in an isostatic process.

11. A method as defined in claim 9 wherein protective powder material is used in said first and second containers and comprises copper powder.

12. A method as defined in claim 9 wherein the first metal, container is generally cylindrical and has a base and side walls incorporating a bellows-like convolution to permit the container during the process to be compressed with substantial reduction in axial length and relatively little change in radial dimensions or distortion.

13. A method as defined in claim 9 wherein the outer container is of generally cylindrical form having a cylindrical side wall incorporating a bellows-like convolution.

14. A method as defined in claim 9 wherein the process is carried out at about 800° C. and at about 20 MPa.

15. A method as claimed in claim 9 wherein said step of applying pressure is conducted for about one hour and the outer container has dimensions in the order of 800 mm diameter, 1800 mm in length and wall thickness of the order of 3 mm, the inner container also having a wall thickness of the order of 3 mm.

16. A method as claimed in claim 9 wherein said application of pressure is conducted in the range 15 to 30 MPa and at a temperature in the range 800° to 850° C.

17. A method as claimed in claim 9 wherein the spacing between the first and second containers after the process is more than 10 times the wall thickness of either of the first and second containers and is approximately 10% of the diameter of the outer container.

18. A method as claimed in claim 9 wherein the waste material comprises nuclear fuel rods configured to be placed in the inner container and surrounded by protective powder material which is a metal powder.

19. A method of immobilising a nuclear waste material comprising:
 (a) taking a relatively thin walled first metal container, the metal being of an alloy which is highly resistant to corrosion, the first container being shaped and dimensioned to be deformable under the temperature and pressure conditions used in the process,
 (b) filling the first container with the nuclear waste material and a metal protective powder material which is copper or a copper alloy highly resistant to corrosion,
 (c) substantially evacuating and closing the first container,
 (d) placing the first container in an outer relatively thin walled container of an alloy which is highly resistant to corrosion and introducing further protective powder material to fill the space between the first container and the outer container and spacing the containers apart, the protective powder material being copper powder or powder of a copper alloy highly resistant to corrosion,
 (e) closing the outer container, and
 (f) heating said containers and their contents to an elevated temperature and effecting hot isostatic pressing, the temperatures and pressures being selected such that the respective containers retain sufficient strength to fulfil a containment function for the nuclear waste during the process and to permit under the applied pressures flow of the protective powder material to form a dense solid matrix enshrouding the spent nuclear waste.

20. A method of storing radioactive waste material comprising placing the waste material in a substantially non-deformable sealed inner vessel of a material which has substantial strength at the elevated temperatures used in the method, locating said vessel within a deformable outer container and spaced from the walls thereof, the outer container having substantial strength at the elevated temperatures used in the method, filling the space between said vessel and said outer container with a metal material which is highly resistant and which, in the method, will provide a dense thick sheath around the inner vessel and will melt at the temperatures employed in the method whereby an assembly is produced, and subjecting the assembly to elevated temperature and pressure to cause compressive deformation of the outer container, formation of the metal into a dense corrosive resistant sheath around the inner vessel and leave the inner vessel substantially undeformed, whereby safe long term storage of the radioactive waste is provided and retrieval of the inner vessel and its contents is achievable by making an opening in the outer container, subjecting the assembly to similar temperatures as those employed in the initial method and removing the molten metal from around the inner vessel.

21. A method as claimed in 20, wherein the inner vessel is of cylindrical shape and has domed ends and, after receiving radioactive waste, is evacuated and sealed, and the outer container is of cylindrical form with a cylindrical side wall formed in a bellows-like shape whereby substantial axial compression of the outer container occurs in the method without substantial radial deformation.

22. A method as claimed in claim 20, and wherein the metal is introduced into the space between the inner vessel and the outer container in particulate form, and the outer container is evacuated and sealed closed before subjecting the assembly to heat and pressure, pressure being applied by an isostatic process.

23. A method as claimed in claim 20, wherein the metal is a copper or copper alloy.

24. A method as claimed in claim 20, wherein the process conditions comprise a temperature of about 800° C. and a pressure of about 20 MPa.

* * * * *